United States Patent Office 3,359,345
Patented Dec. 19, 1967

3,359,345
BUTADIENE-STYRENE BLOCK COPOLYMERS
REACTED WITH MONOMERIC MIXTURES
Kenneth W. Doak, Wyckoff, and Frederick E. Carrock,
Paramus, N.J., assignors to Rexall Drug and Chemical
Company, Los Angeles, Calif., a corporation of
Delaware
No Drawing. Filed Nov. 25, 1964, Ser. No. 414,022
2 Claims. (Cl. 260—880)

ABSTRACT OF THE DISCLOSURE

The novel transparent graft interpolymer comprises 4 to 20 weight percent of a linear SBR block copolymer and the remaining 96 to 80 percent comprises 10 to 25 parts alpha-alkylstyrene, 84 to 55 parts alkyl methacrylate, 3 to 10 parts acrylonitrile and 3 to 10 parts of methacrylic acid.

---

This invention relates to a novel process for preparing clear and transparent interpolymers of at least two polymerizable components which include methyl methacrylate and alpha-methylstyrene (or the simple alkyl derivatives thereof) and a rubbery component. Certain of the interpolymer compositions are believed to be new compositions of matter.

The copolymerization of alkyl methacrylates with alpha-alkylstyrenes has been known for a number of years (see for example Walling, Journal American Chem. Society, 70, 1543 (1948); and C.A., 44, 7089e). The copolymerization reaction as described in these reference was carried out in bulk and for extremely long polymerization times and in many instances, the polymers resulting therefrom were never suitable for any commercial application due to the extremely large amount of unreacted monomers remaining in the polymer, as well as the low molecular weight of the product. Subsequent workers in this field of interpolymers were able to improve on the methods referred to above by polymerization of methyl methacrylate and alpha-methylstyrene for periods of 7 days or greater, the polymerizations being carried out in bulk as illustrated in British Patents 938,305 and 836,837. Still subsequent improvements as illustrated in U.S. Patent 3,135,723 reveal that the 7 day polymerization cycle of the prior art can be considerably reduced to a period of about 70 hours or a little higher by the use of certain peroxide initiators to obtain copolymer compositions having improved melt flow properties, heat deflection and tensile values.

While the copolymerization reaction of methyl methacrylate and alpha-methylstyrene has been adequately described in the foregoing patents, the introduction of a new component into the system is described in British 924,233 and U.S. 3,029,222. The British patent discloses that rubbery polymers of polybutadiene can be incorporated into the reaction mixture consisting of methyl methacrylate and alpha-methylstyrene in amounts of from 1 to 20 parts by weight to obtain high impact strength materials. As with the case involving the copolymerization of these two monomers, however, this prior art reference teaches the polymerization in bulk and a long reaction time, such as 7 days to obtain an impact resistant product. The specification indicates that transparent polymers from compression molded sheets could be obtained, but these had a slightly yellow brown color. In the U.S. patent, the notched Izod impact strengths of injection molded specimens ranged from only 0.69 ft. lb. per inch of notch to a high of about 1.2.

In the interpolymerization reaction involving methyl methacrylate, alpha-methylstyrene and a rubbery component, it is highly desirable that alpha-methylstyrene enter the reaction to an extent of at least 10%; otherwise, the heat deflection values of the ultimate polymer will be low. As illustrated in the cited art above, however, in order for this amount or more of alpha-methylstyrene to enter into the reaction, extremely long polymerization times are required, even when using the improved method taught in 3,135,723. Moreover, when a component such as a rubbery material is added to the copolymerization mixture, the initial stages of the polymerization reaction are difficult to handle because of highly viscous mixtures. The viscosity, as a matter of fact, is so high that attempts to stir or agitate the mixture become difficult. Nevertheless, these agitation attempts led to the finding that polymerization times (cycles) could be considerably reduced from those heretofore practiced in the prior art. Not only were the polymerization cycles reduced by the technique of this invention, but it was found that important properties such as heat deflection and Izod impact could be enhanced by the introduction of even further components to the reaction mixture as will be more fully described hereinafter. The process of this invention therefore provides a greatly improved method of carrying out an interpolymerization reaction, in that shorter polymerization cycles are utilized which thereby makes this interpolymer preparation commercially attractive. Also, it was found that certain rubbery components prepared by stereospecific catalysts (linear rubbers) have surprisingly resulted in water white transparent impact resistant interpolymers useful for a variety of purposes.

It is an object of this invention to provide a novel process for the interpolymerization reaction of an alkyl methacrylate and an alpha-alkylstyrene. It is a further object of this invention to provide a novel process for preparing clear and transparent impact resistant interpolymers of an alkyl methacrylate, an alpha-alkylstyrene and a linear rubbery component using fast polymerization cycles.

It is still a further object of this invention to prepare new polymeric compositions including at least two polymerizable monomers such as an alpha-alkylstyrene and an alkyl methacrylate with novel linear copolymer rubbers.

The foregoing objects are attained by the process of this invention which encompasses carrying out the polymerization of a composition comprising an alkyl methacrylate and an alpha-alkylstyrene in two separate process steps involving a first bulk or solution prepolymerization reaction step with shearing agitation and the carrying out of this step until from about 10 to 40% solids is obtained and the second step being carried out in bulk, solution, or suspension, without shearing agitation to obtain a substantially complete conversion of the monomers to the interpolymers of this invention. As a further novel feature of the process herein, from 4 to 20% by weight of a rubbery component can be incorporated in the reaction and this embodies the preferred process herein.

In addition to the foregoing general process steps involving the polymerization of the alkyl methacrylate and alpha-alkylstyrene monomers, it was further found that the use of minor amounts of acrylonitrile such as from 3 to 10% considerably enhanced clarity of the interpolymer, as well as the impact resistance. It was further found that the incorporation of minor amounts of methacrylic acid such as from 3 to 10% enhanced the heat deflection properties of the interpolymer product. Thus, acrylonitrile and/or methacrylic acid are useful in varying the foregoing properties of these polymers and these can be incorporated separately or together depending on the ultimate properties desired. Certain low viscosity linear polymers of polybutadiene and copolymers of styrene and butadiene have yielded excellent product by way of clarity and transparency, such properties not being obtained with ordinary homopolymers or SBR polymers prepared by emulsion polymerization techniques. Moreover, with ordinary emulsion polymerized SBR polymers the initial solution viscosity of the monomer-rubber mixture is extremely high and this hinders proper heat transfer and shearing conditions, thereby affecting adversely the ultimate polymer properties.

It is desired that the final product contain at least 10% by weight of alpha-methylstyrene in the polymer, and to this end the initial alkyl methacrylate:alpha-alkylstyrene monomer ratios can vary from 65:35 to 90:10. Amounts of alpha-methylstyrene of up to 20% or 25% increase the heat deflection values of the polymer, but then due to the slow reactivity of alpha-methylstyrene, longer reaction periods are required at these higher concentrations. By the use of peroxide initiators and the shearing agitation step in the prepolymerization reaction of the process herein, commercially attractive polymerization rates are obtained and the impact values of the products prepared differ in kind over those reported in the prior art.

As used in this specification, the term "shearing agitation" means that degree and type of agitation which results in a dispersed rubber phase with rubber particles ranging in size from 0.1 to 10 microns with the major portion of the rubber particles ranging from 1 to 5 microns. This is accomplished by introducing the rubber in monomer solution, agitating during the prepolymerization step so that after the formation of a certain amount of copolymer, the rubber is no longer compatible in the system and preferentially precipitates out as a highly swollen mass. With the appropriate amount of shearing, this mass is dispersed quite readily into discrete particles. Optimum polymer properties are achieved when the shearing conditions are sufficient to yield the above preferred rubber particle size range. The particle size can be readily ascertained by use of a suitable microscope. By the term "transparent" polymer product is meant that a compression molded disc of about ⅜" thickness is transparent to print, that is, if such a disc is held at least 12" above typewritten print, such print will be clear and readable. This is an arbitrary test for transparency of the polymer product (transparency can be improved if the disc is injection molded). At any rate, the foregoing test is used merely for purposes of illustrating a novel feature of the products of this invention. The term "alkyl" with reference to alkyl methacrylate and alpha-alkylstyrene, refers to the lower alkyl groups such as methyl, ethyl, propyl, butyl, etc. Reference will be made hereinafter, however, to methyl methacrylate and alpha-methylstyrene as illustrative. By the term "graft interpolymer" is to be understood the reaction product obtained by polymerizing alkyl methacrylate and alpha-alkylstyrene in the presence of a rubbery component. The graft interpolymers can also contain minor amounts of acrylonitrile and/or methacrylic acid.

The novel compositions of this invention can best be defined as graft interpolymers of from 4 to 20% by weight of a rubbery component, with the remainder 96 to 80% comprising in parts by weight from about 10 to 25 parts alpha-alkylstyrene, 84 to 55 parts alkyl methacrylate, and 3 to 10 parts acrylonitrile and/or 3 to 10 parts methacrylic acid when these latter two are used in the preparation of the interpolymer. If only acrylonitrile is desired for purposes of enhancement of impact properties, for example, then the amount of alkyl methacrylate ranges in parts by weight from 87 to 65 (similarly when only methacrylic acid is employed). Where the novel composition includes only the linear copolymer, styrene-butadiene rubber (in amounts of 4 to 20% by weight as above), alkyl methacrylate and alpha-alkylstyrene, then the amount of alkyl methacrylate in parts by weight ranges from 90 to 75, while alpha-alkylstyrene remains at 10 to 25. Excellent interpolymer compositions have been prepared using fast polymerization cycles when the rubbery component which is used in amounts of from 4 to 20% by weight is characterized by having a solution viscosity at about 25° C. of 25 to 80 cps. in a 5% styrene solution as measured in a Brookfield viscometer, preferably 30 to 60, the remainder of the 96 to 80% by weight of the composition comprising from 90 to 75 parts by weight alkyl methacrylate and 10 to 25 parts by weight alpha-alkylstyrene.

The amount of rubbery component in all of the above compositions can suitably be narrowed to from 5 to 15% by weight and the remainder 95 to 85% can comprise the above named components in the parts by weight indicated.

The constant polymerizing mixture of methyl methacrylate and alpha-methylstyrene is unique in that it is greatly dependent upon a particular polymerization temperature (paper presented by K. W. Doak at the Cleveland meeting of the American Chemical Society, April 1960). For example, the reactivity ratios of these two monomers change markedly as the temperatures are varied and it becomes necessary, therefore, to take this into consideration in preparation of interpolymers having a desired composition. In contrast to this, the reactivity ratios for most other systems change only slightly with temperatures and are therefore easier to control with respect to this variable. Thus, the maximum amount of alpha-methylstyrene that can be incorporated in the copolymer system occurs at temperatures between about 30° to 60° C. These are not useful polymerization temperatures, however, with systems containing alpha-methylstyrene monomer because of the reduced polymerization rates which require long reaction cycles. It has been calculated, however, that at about 100° C. the constant polymerization mixture of methyl methacrylate:alpha-methylstyrene has a monomer ratio of approximately 85:15. At 130° C. no constant polymerizing mixture exists. This is because of the overwhelming preference for the addition of methyl methacrylate to the growing radical chains.

In view of the above statements, it is clear that the bulk of the polymerization should be carried out at temperatures of about 90° to 110° C., that is, around 100° C. in order to incorporate at least 10 percent alpha-methylstyrene into the copolymer system. By this is meant that both the prepolymerization and polymerization steps are carried out substantially within this temperature range. Toward the end of the polymerization, however, it may be desirable to increase the temperature above 110° C., for example, up to 130° C. for a short period in order to reduce monomer content, if any, in the system.

At these polymerization temperatures suitably at least 10% alpha-methylstyrene is incorporated in the ultimate polymer. At higher initial temperatures such as 130° and above, as indicated, the methyl methacrylate polymerizes at a faster rate than alpha-methylstyrene and consequently larger amounts of alpha-methylstyrene remain unreacted. Thus, to arrive at a suitable balance of properties, such as heat deflection values of 95 to 105° C., hardness values of 80 to 100 or more on the Rockwell L Scale, impact values (injection molded) of above 2 and up to 4 at a reasonably fast polymerization cycle, it is necessary to use a prepolymerization step with shearing agitation, followed by either a suspension step to prepare beads, or a bulk step, or a solution step without shearing agitation to obtain the polymer in other forms. It is preferred to employ an inert solvent such as one boiling between 100 and 220° C. in the prepolymerization step whenever high viscosity linear rubbers are employed, such solvent being used in amounts of from 5 to 20%. Ethylbenzene is an excellent solvent for this purpose and its use will be illustrated in the example to be given hereinafter. Others which can be used are diethylbenzene and the methylethylbenzenes.

The various tests referred to herein are standard ASTM tests frequently used to measure physical properties of various thermoplastics. In this specification: (a) Heat deflection values where indicated were determined by ASTM D–648–56 at 264 p.s.i.; (b) Izod impact by ASTM D–256–56 with injection molded specimens; (c) Melt Flow by ASTM D–1238–57T at 190° C. and a 5,000 gram load unless otherwise indicated; (d) Mooney Viscosity (ML–4) as measured at 212° F. by ASTM D–927–55T and (e) Rockwell Hardness L and M Scales by ASTM D–785–51.

As indicated, the prepolymerization step is carried out with agitation and conversions are limited to a total percent solids of at least 10, but can be increased up to 40% prior to carrying out the second polymerization reaction. This prepolymerization step can be carried out with suitable initiators, specifically those having adequate free radical initiating properties at the preferred prepolymerization temperatures of 90 to 110° C. A thermal prepolymerization system can also be carried out, but this requires a somewhat longer cycle.

After the prepolymerization step, the prepolymer can be suspended in an aqueous solution comprising surface acting agents and additional initiators and the polymerization carried out to completion. The prepolymer can be transferred to a separate vessel and polymerized statically at preferred heating cycles to be illustrated hereinafter. This static polymerization (absence of shearing agitation) can be carried out with additional peroxide initiators and moreover, can be carried out in the presence of a diluent (also referred to as solvent) if such is used in the initial prepolymerization step.

As a suspending agent for the suspension step polymerization where the product is desired in the form of beads, there can be used a water soluble non-ionic colloid of high viscosity in an aqueous solution. Hydroxyethyl cellulose is particularly preferred for this step and specifically one whose viscosity in a 1% aqueous solution at 25° C. is from 750–10,000 cps. (Brookfield viscometer), more preferably 1500–3500 cps. The amount of hydroxyethyl cellulose which can be used is from 0.075 to 0.25 weight percent based on the water.

As peroxide initiators for the prepolymerization step there can be included t-butyl perbenzoate, t-butyl peracetate, 2,5-dimethylhexane-2,5-diperbenzoate, benzoyl peroxide, di-t-butyl diperphthalate, 2-(2'-hydroxyethylazo)-3,4-dimethylvaleronitrile and the like. The amounts to be used can range from 0.01 to 1.0% based on the reaction mass. For the static polymerization cycle an additional 0.01 to 1.0% of any of the above initiators can be used either by adding this amount initially to the prepolymerization step or as a separate addition during the static polymerization cycle. It is advantageous to also include a high temperature initiator in an amount of 0.01 to 0.25% based on the reaction mass. This initiator can also be added prior to the prepolymerization reaction or to the static polymerization step. Suitable high temperature initiators are dicumyl peroxide, 2,5-dimethyl-2,5-di(t-butylperoxy)hexane, di-t-butyl peroxide and the like. The high temperature peroxides' function in the static polymerization step is to enhance conversion of the last small percentage of unreacted monomer remaining when the highest temperature portion of the cycle is reached.

Other additives that can be employed in the process herein include lubricants such as mineral oil, stabilizers such as trisnonylphenyl phosphite and chain regulators such as mercaptans.

A particularly preferred rubbery component is a solution polymerized stereo-regular copolymer of butadiene and styrene which has a 90/10 (butadiene/styrene) weight percent composition prepared by the use of lithium organometallic catalysts and sold under the trademark "Duradene." This solution polymerized copolymer has a viscosity of 35 cps. in a 5% styrene solution and can be easily graft polymerized by the process of this invention. As a matter of fact, it is a feature of this invention to employ these linear or solution polymerized styrene-butadiene copolymers, specifically those having a butadiene content between 80 to 95 weight percent. It has been found that better clarity is imparted to the novel interpolymers of this invention when such a styrene-butadiene copolymer is used. It was demonstrated, for example, that when the styrene content of the copolymer exceeded 20% or conversely, the butadiene content decreased below 80% that physical properties of the interpolymer such as clarity were affected. Moreover, the higher styrene content copolymers of styrene-butadiene are more viscous, and not as easy to handle. In some cases, due to this difficulty in handling these copolymers, other physical properties are detrimentally affected. It is preferred, therefore, to employ a solution polymerized linear SBR, whether random or block, of viscosities heretofore indicated (see British Patent 895,980). As indicated above, the solution polymerized linear SBR's can be prepared by employing lithium alkyl complexes (lithium methyl, for example) and those containing from 5 to 20%, preferably 5 to 10%, bound styrene can have solution viscosities (in 5% styrene) of about 30 to 60 cps. With these lower solution viscosities, the preploymerization step can be carried out with greater ease than in the case with the higher viscosity rubbers. Moreover, higher concentrations of rubber can be employed in the prepolymerization step. As used in this specification, the term "linear rubbers" means those homo- or copolymer rubbers (such as homopolymers of butadiene and copolymers of styrene and butadiene) which have been prepared by stereospecific catalysts, usually in solution, such rubbers differing in many important properties from their emulsion polymerized counterparts.

When the preferred linear rubbers are employed according to the invention herein, it is found that, due to the lower solution viscosity, the prepolymerization step can be carried out with greater ease than when employing other higher viscosity rubbers. Moreover, higher concentrations of rubber can be employed in the prepolymerization step.

The homopolymer linear rubbery components of this invention particularly suitable for the process are linear polybutadienes of a cis content of at least 30% and of a Mooney viscosity ranging from 10 to 90. Solution viscosities of these linear polybutadienes in styrene can likewise range from 25 to 80 cps. (5% solution in styrene). Thus, a particular linear polybutadiene herein preferred has a Mooney viscosity of 10 and a solution viscosity of 46 cps. These linear rubbers have yielded clear and transparent products free from the yellowish brown color reported in the prior art.

Reference is had to the following examples for a further description of this invention.

In order to further illustrate the novel process and certain novel interpolymers of this invention which result in water white transparent impact resistant materials, the following examples are offered. In Example 1, Table I below, the novel linear SBR's described hereinbefore were employed in the polymerization reaction. These novel elastomers as hereinbefore stated have a 90/10 composition of butadiene-styrene and have low solution viscosities in styrene as compared to ordinary emulsion polymerized SBR's.

*Example 1*

Following the agitated bulk procedure for the prepolymerization step followed by a suspension polymerization step employing hydroxyethyl cellulose as the suspending agent, the following runs were carried out under the conditions noted in Table I below. In all of the runs 0.2 percent by weight of trisnonylphenyl phosphite was included. In all runs in subsequent examples, the same procedure was followed unless otherwise noted in the comments following the tables.

TABLE I

|  | Run Number | |
|---|---|---|
|  | 1 | 2 |
| Prepolymerization Step: | | |
| Methyl Methacrylate | 85 | 85 |
| Alpha-Methylstyrene | 15 | 15 |
| Linear SBR (90/10), percent | 8 | 8 |
| Tertiary Dodecyl Mercaptan | | 0.2 |
| t-Butyl Perbenzoate, percent | 0.2 | 0.2 |
| Temperature, °C./hrs | 102/5 | 103/5 |
| Total Solids, percent | 23 | 22 |
| Polymerization Step | 65/100 | 16/100 |
| Cycle, Hours/° C | | 4/120 |
| Physical Properties: | | |
| Izod Impact | 2.0 | 2.0 |
| Melt Flow at 230° C | | |
| Rockwell Hardness, L/M | 98/— | 93/64 |
| Heat Defl. Temp., °C | 98 | 95 |

Table I information is as follows: Run Number 1 illustrates that a rather long total polymerization period of about 70 hours does not result in polymers having properties substantially different than those prepared using shorter reaction times. The data indicate that during this prolonged polymerization period at the temperatures indicated that substantially the constant polymerizing mixture of 85:15 methyl methacrylate:alpha-methylstyrene reacted at this ratio in view of the steady temperature employed of about 100° to 102° C. If this run is compared to Run Number 2, which was a fast polymerization cycle of about 25 hours total, it will be seen that the Izod impact properties are identical and the hardness and heat deflection temperature properties are substantially the same. Moreover, Run Number 2 illustrates that the bulk of the polymerization occurred at about 100° C., which is necessary to obtain at least 10% alpha-methylstyrene incorporation into the polymer system as evidenced by the similarity in physical properties with Run Number 1, which was polymerized at essentially 100° C.

*Example 2*

In this example, there is illustrated the effect of varying certain polymerization conditions such as temperature. Table II below summarizes these runs.

TABLE II

|  | Run Number | | |
|---|---|---|---|
|  | 3 | 4 | 5 |
| Prepolymerization Step: | | | |
| Methyl Methacrylate | 85 | 85 | 85 |
| Alpha-Methylstyrene | 15 | 15 | 15 |
| Linear SBR (90/10), Percent | 8 | 8 | 8 |
| Tertiary Dodecyl Mercaptan | 0.1 | 0.2 | 0.1 |
| Di-t-Butyl Peroxide | 0.2 | 0.2 |  |
| Temperature, °C./hrs | 115/3 | 115/3 | 125/6.5 |
| Total Solids, percent | 24 | 24 | 24 |
| Polymerization Step | 16/115 | 16/115 | 20/125 |
| Cycle, Hours/° C | 4/130 | 4/130 | 1/140 |
| Physical Properties: | | | |
| Izod Impact | 2.2 | 2.4 | 1.6 |
| Melt Flow at 230° C | | | |
| Rockwell Hardness, L/M | 83/51 | 82/42 | 84/42 |
| Heat Defl. Temp., °C | 85 | 87 | 74 |

The foregoing table illustrates the effect of increasing polymerization temperatures particularly on physical properties such as heat deflection temperature and hardness. In Runs Number 3 and 4, for example, at a polymerization temperature of 115° C., the polymer obtained exhibited heat deflection temperatures of 85° to 87° C., while at a polymerization temperature of 125° C., Run Number 5 had a heat deflection temperature value of only 74. Hardness values for the polymers were also considerably reduced as compared to the polymers prepared at temperatures of approximately 100° C. In general, it can be seen that the heat deflection values were lower using higher temperatures as compared to those runs using temperatures of approximately 100° C. (Table I). The difference, which amounted to from 10° to 25° C., is shown to increase as the polymerization temperature is increased. This, as previously indicated, is due to the lesser incorporation of alpha-methylstyrene as the polymerization temperature is increased.

*Example 3*

The following runs illustrates reactions wherein the methyl methacrylate:alpha-methylstyrene ratio was increased. The increased incorporation of alpha-methylstyrene beneficially increases the heat deflection temperature values.

TABLE III

|  | Run Number | | | |
|---|---|---|---|---|
|  | 6 | 7 | 8 | 9 |
| Prepolymerization Step: | | | | |
| Methyl Methacrylate | 75 | 75 | 75 | 75 |
| Alpha-Methylstyrene | 25 | 25 | 25 | 25 |
| Linear SBR (90/10), percent | 8 | 8 | 8 | 8 |
| Tertiary Dodecyl Mercaptan | 0.1 | 0.1 | 0.2 | 0.1 |
| t-Butyl Perbenzoate | 0.2 | 0.2 | 0.2 | 0.2 |
| di-t-Butyl Peroxide | 0.1 | | | |
| Temperature °C./hrs | 105/5 | 105/5 | 105/5 | 105/5 |
| Total Solids | 25 | 20 | 21 | 14 |
| Polymerization Step | 65/105 | 48/105 | 40/105 | 16/105 |
| Cycle, Hours/° C | 4/130 | 2/120 | 2/120 | 2/120 |
| Physical Properties: | | | | |
| Izod Impact | 2.2 | 1.8 | 1.6 | 2.2 |
| Rockwell Hardness, L/M | 96/69 | 94/67 | 95/67 | 95/— |
| Heat Deflection Temp., °C | 98 | 102 | 99 | 102 |

The foregoing runs illustrate that at a monomer mixture of 75:25 methyl methacrylate:alpha-methylstyrene that polymerization times at around 100° C. can be reduced from a total of about 74 hours (Run Number 6) to about 23 hours (Run Number 9) without affecting the amount of alpha-methylstyrene incorporated in the copolymer system as evidenced by the retention of the excellent high heat deflection temperatures and surface hardness properties.

*Example 4*

The runs illustrated below show incorporation of acrylonitrile for Izod impact value improvement, methacrylic acid for heat deflection value improvement and includes one run showing a methyl methacylate:alpha-methylstyrene ratio of 65:35. The polybutadiene used in Runs Number 11 and 13 was a linear rubber having a cis-1,4 content of 35% and a Mooney viscosity of 55. Although this linear polybutadiene has a somewhat high viscosity in a 5% solution in styrene, nevertheless, by the improved process of this invention it was completely feasible to handle this rubbery component efficiently in the preparation of the interpolymers illustrated.

TABLE IV

|  | Run Number | | | |
|---|---|---|---|---|
|  | 10 | 11 | 12 | 13 |
| Prepolymerization Step: | | | | |
| Methyl Methacrylate | 82.5 | 82.5 | 65 | 82.5 |
| Alpha-Methylstyrene | 12.5 | 12.5 | 35 | 12.5 |
| Acrylonitrile | 5 | 5 | 5 |  |
| Methacrylic Acid, percent | | | | 5 |
| Polybutadiene | *8 | 8 | *8 | 8 |
| Tertiary Dodecyl Mercaptan | 0.2 | 0.1 | 0.1 | 0.1 |
| di-t-Butyl Peroxide | | | 0.1 | |
| t-Butyl Perbenzoate | 0.2 | 0.2 | 0.2 | 0.2 |
| Temperature °C./hrs | 103/7 | 102/3 | 110/6 | 102/4 |
| Total Solids, percent | 22 | 24 | 26 | 23 |
| Polymerization Step | 16/100 | 16/100 | 20/110 | 16/100 |
| Cycle, Hours/° C | 4/120 | 4/120 | 4/130 | 4/120 |
| Physical Properties: | | | | |
| Izod Impact | 3.4 | 3.0 | 3.4 | 2.6 |
| Melt Flow at 230° C | | | | |
| Rockwell Hardness, L/M | 87/58 | 82/46 | 83/48 | 82/48 |
| Heat Defl. Temp., °C | 93 | 98 | 93 | 102 |

*Linear SBR (90/10).

In the table above, it is illustrated (Runs Number 10, 11 and 12) that acrylonitrile increases Izod impact values by as much as 50% or more in comparison to runs wherein this ingredient was omited. Note also Run Number 12 which illustrates a 65:35 methyl methacrylate:alpha-methylstyrene monomer ratio. In this run, the acrylonitrile (5 parts by weight) was added after the prepolymerization step. Run Number 13 shows very strikingly the effect of 5% methacrylic acid in increasing the heat deflection temperature of the interploymer prepared.

The short polymerizaiton cycles illustrated in the foregoing runs and the physical properties of the polymer including excellent transparency provides unique interpolymers as well as process for preparing same.

In order to demonstrate further the polymerization process herein with other elastomers or rubbery materials as prepared by the technique of this invention, Example 5, Table V is herein presented.

Example 5

In this example there was used as the rubbery material a polybutadiene polymerized by stereospecific catalysts and containing about 35 percent cis-1,4 content. A preferred low Mooney viscosity linear polybutadiene was also employed in two runs below and a linear SBR containing 75% butadiene and 25% styrene (a block copolymer). As in the previous runs, all the present runs contained 0.2 percent of trisnonylphenyl phosphite.

TABLE V

|  | Run Number | | | | |
|---|---|---|---|---|---|
|  | 14 | 15 | 16 | 17 | 18 |
| Prepolymerization Step: | | | | | |
| Methyl Methacrilate | 85 | 85 | 85 | 85 | 85 |
| Alpha-Methylstyrene | 15 | 15 | 15 | 15 | 15 |
| Polybutadiene | 6 | 8 | ¹8 | ²8 | ²8 |
| Tertiary Dodecyl Mercaptan | 0.1 | 0.2 | 0.1 | 0.1 | 0.1 |
| Benzoyl Peroxide | | 0.2 | | | |
| t-Butyl Perbenzoate | 0.3 | | 0.3 | 0.2 | |
| di-t-Butyl Peroxide | | | | | 0.2 |
| Ethylbenzene | 10 | 20 | | | |
| Mineral Oil | | | | | 2 |
| Temperature, °C./hrs | 100/4 | 100/3 | 102/6.5 | 106/4 | 106/4 |
| Total Solids, percent | 17 | 14 | 21 | 23 | 23 |
| Polymerization Step | 24/100 | 16/100 | 65/100 | 24/105 | 24/105 |
| Cycle, Hours/° C | 2/120 | 4/115 | | | |
| Physical Properties: | | | | | |
| Izod Impact | | 1.8 | .4 | 1.4 | 2.2 |
| Melt Flow at 230° C | 0.2 | | 0.5 | | |
| Rockwell Hardness, L/M | 100/— | 94/— | 102/— | 96/98 | 84/50 |
| Heat Defl. Temp., °C | 96 | 101 | | 100 | 95 |

¹ Linear SBR (see below).
² Low Mooney polybutadiene rubber (see below).

From Table V, the following observations can be made. Runs Number 14 and 15 illustrate the use of polybutadiene rubber of a Mooney viscosity of 55 (similar to Runs Number 11 and 13) and employing a two step bulk-solvent technique of this invention. The use of the solvent aided considerably during the critical prepolymerization step. The use of 20 percent solvent indicates excellent control of the prepolymerization reaction and the use of a fast heating cycle to obtain a high impact clear and transparent interpolymer with an excellent heat deflection value. Run Number 16 illustrates the use of still another type of linear SBR (higher viscosity) containing around 20 to 25 percent bound styrene and the polymer therefrom had poor clarity and poor impact, illustrating that because of the higher styrene content in this SBR it was not as good as the polybutadienes or the lower styrene content SBR's. Finally, Runs Number 17 and 18 illustrate the use of a low Mooney viscosity (10) linear polybutadiene and the use of mineral oil (Run 18). Note that higher prepolymer conversions are feasible with the rubber of Run Number 17 and Run Number 18. Run Number 18 contained mineral oil and resulted in a polymer of lower heat deflection temperature and lower surface hardness as expected, but the clarity was not affected and this was unexpected.

In the foregoing description of the invention, it was pointed out with respect to the polymerization that in some instances it might be desirable to increase the temperature of the polymerization above 110° C., for example, up to 130° C. for a short period in order to reduce monomer content, if any, in the system. While this is one approach to removal of any unreacted monomer applicable to the higher alpha-methylstyrene content formulations, specifically towards the end of the polymerization reaction, another approach which is of some merit is to devolatilize products by heating in an environment which is under vacuum such as in a vented extruder. In the case of a suspension process, a specific and highly efficient method of monomer removal, specifically alpha-methylstyrene, in accordance with this invention, is to steam strip the bead product after completion of the suspension polymerization cycle. This is accomplished by heating the suspension slurry to a temperature of from 100° to 150° C. and maintaining this temperature for a period of from 1 to 8 hours while passing superheated steam therethrough and removing the volatile vapors therefrom by condensation. When this is accomplished, heat deflection temperatures of the product are higher by an order of 10° to 20° C. than for those illustrated in the above examples. Thus, by this technique, transparent impact resistant polymers in accordance with the process herein can be obtained with heat deflection temperatures of up to 120° C.

The clear and transparent impact resistant interpolymers of this invention are useful in many new applications, particularly where these two properties are specifically desired, such as in injection molded articles and the like.

As illustrated above, therefore, this invention provides a versatile polymerization process and new interpolymers which can be prepared economically at attractive polymerization rates. Various modifications can be made herein without departing from the scope of this invention.

What is claimed is:

1. A transparent graft interpolymer of from 4 to 20% by weight of a solution polymerized linear styrene-butadiene block copolymer having from 5 to 20 percent bound styrene, the remainder 96 to 80% comprising in parts by weight 10 to 25 parts alpha-alkylstyrene, 84 to 55 parts alkyl methacrylate, 3 to 10 parts acrylonitrile and 3 to 10 parts of methacrylic acid.

2. The graft interpolymer of claim 1 wherein alkyl methacrylate and alpha-alkylstyrene are methyl methacrylate and alpha-methylstyrene.

References Cited

UNITED STATES PATENTS

| 3,230,277 | 1/1966 | Schramm | 260—880 |
| 3,243,481 | 3/1966 | Ruffing et al. | 260—880 |
| 3,267,178 | 8/1966 | Lee | 260—880 |
| 3,268,625 | 8/1966 | Jones et al. | 260—880 |
| 3,287,301 | 11/1966 | Fysh et al. | 260—23.7 |
| 3,287,443 | 11/1966 | Saito et al. | 260—876 |

GEORGE F. LESMES, *Primary Examiner.*